Aug. 5, 1952 G. F. SMEDES 2,605,708
FLUID EJECTOR SYSTEM AND VALVE THEREFOR
Filed July 9, 1947 4 Sheets-Sheet 1

Inventor
George F. Smedes
By Alfred W. Vibber
His Attorney

Aug. 5, 1952 G. F. SMEDES 2,605,708
FLUID EJECTOR SYSTEM AND VALVE THEREFOR
Filed July 9, 1947 4 Sheets-Sheet 2
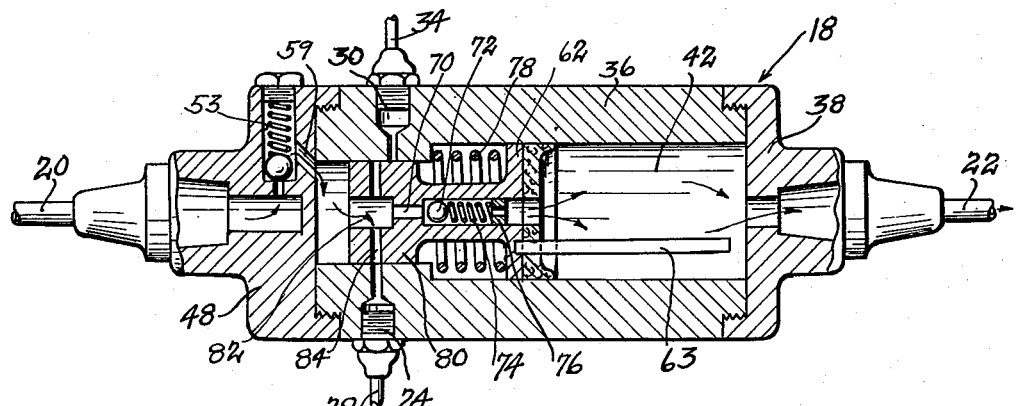
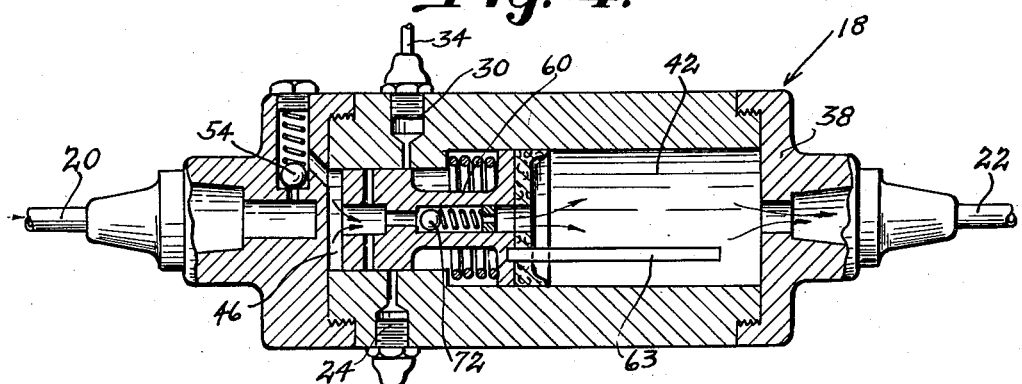
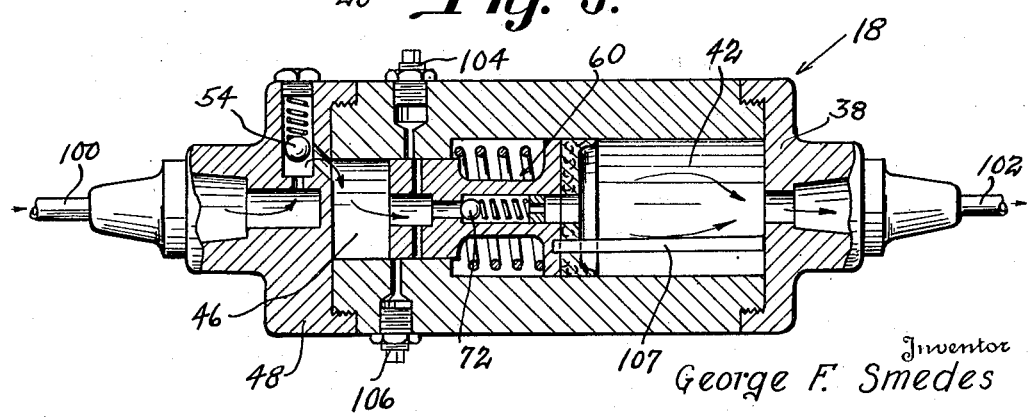
Inventor
George F. Smedes
By Alfred W. Vibber
His Attorney Aug. 5, 1952     G. F. SMEDES     2,605,708
FLUID EJECTOR SYSTEM AND VALVE THEREFOR
Filed July 9, 1947     4 Sheets—Sheet 3

Inventor
George F. Smedes
By Alfred W. Vibber
His Attorney

Aug. 5, 1952           G. F. SMEDES           2,605,708
FLUID EJECTOR SYSTEM AND VALVE THEREFOR

Filed July 9, 1947           4 Sheets-Sheet 4

Inventor
George F. Smedes
By Alfred W. Nibber
His Attorney

Patented Aug. 5, 1952

2,605,708

UNITED STATES PATENT OFFICE 2,605,708

FLUID EJECTOR SYSTEM AND VALVE THEREFOR

George F. Smedes, Passaic, N. J., assignor of one-half to Russell B. Phillips and G. Willard Phillips, partners, trading as Phillips Brothers, Wallington, N. J.

Application July 9, 1947, Serial No. 759,787

9 Claims. (Cl. 103—6)

This invention relates to a fluid mixing system and to a valve for use therein. In one of the preferred embodiments of the system, employing an injector valve, described herein, such system is employed as a means for priming the pump impelling a first fluid, such as fuel oil, and for injecting a second fluid, such as a solvent, into an oil burner system. The injector mixing system and the valve therefor of the invention, however, are capable of use in injector and mixing systems generally, as will appear.

The invention has among its objects the provision of a system of the type indicated for introducing a second fluid into a first fluid, held under periodically varying pressure, upon a drop in pressure upon such first fluid.

The invention has as a further object, in one specific embodiment thereof, the provision of a system which automatically injects carbon solvent into the pump and nozzle of an oil burner.

Still a further object of the invention is the provision in such injecting system, in apparatus such as an oil burner, of means which also automatically bleeds and primes the pump.

Yet another object of the invention is the provision of a simple, easily manufactured and maintained, valve of such flexibility that it may be employed in any of the above indicated systems.

These and further objects of the invention will be more readily apparent in the description of preferred embodiments thereof, as illustrated in the accompanying drawings in which:

Figure 3 is a view similar to that of Figure 2, with the valve element in the position it assumes a short time after the pump is started;

Figure 4 is a view similar to those of Figures 2 and 3, with the movable valve element in the position it assumes upon steady operation of the pump;

Figure 5 is a view in longitudinal section of the injector valve when employed simply as a fluid injector in a fluid mixing system;

Figure 1:
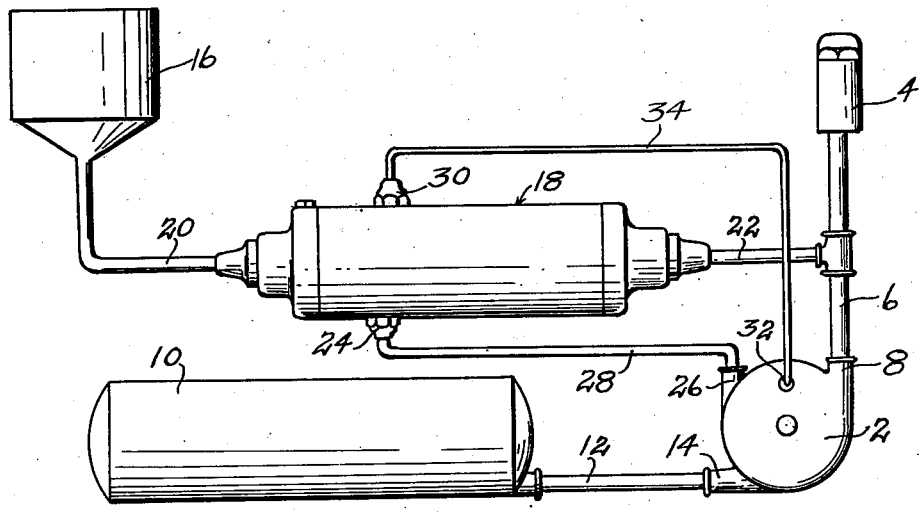
Figure 1 is a somewhat schematic layout of an oil burner and the supply therefor with the fluid injector and pump bleeding and priming system of the present invention installed thereon.

In Figures 1 to 4, inclusive, there is shown an oil burner system incorporating the fluid injector system and valve of the invention. In Figure 1 the oil burner, shown schematically, includes the oil burner pump 2 and the burner nozzle 4 which conventionally includes a strainer, not shown, to prevent the passage of foreign material contained in the fuel delivered under pressure to the atomizer of the nozzle. The fuel oil is delivered from the pump by way of delivery port 8 and delivery pipe 6 leading to the nozzle. The fuel oil supply, contained in tank 10, is led to the pump 2 by means of the delivery pipe 12 connected to the inlet port 14 of the pump.

In accordance with this embodiment of the invention, means are provided automatically to inject a carbon solvent, mixed with fuel oil, into the burner nozzle and the pump immediately before the pump ceases to operate, at the completion of one cycle of the burner, and again immediately after starting the pump upon the initiation of another burner cycle. By reason of such system, the parts of the oil burner most likely to be affected by the deposit of carbon therein are periodically subjected to carbon solvent, and thus remain clean and free from deleterious deposits for long periods of time.

Such solvent injecting system includes the supply tank 16 for the solvent which is connected to one end of the injector valve 18 by pipe 20, the other end of the valve being connected to delivery pipe 6 by pipe 22. In this embodiment, valve 18 is also employed to prime the pump by means of the priming port 24 connected by pipe 28 to the vacuum port 26 of the pump. The valve is also employed automatically to bleed the pump, the bleeding port 30 of the valve being connected to bleeding port 32 of the pump by pipe 34.

Figure 2:
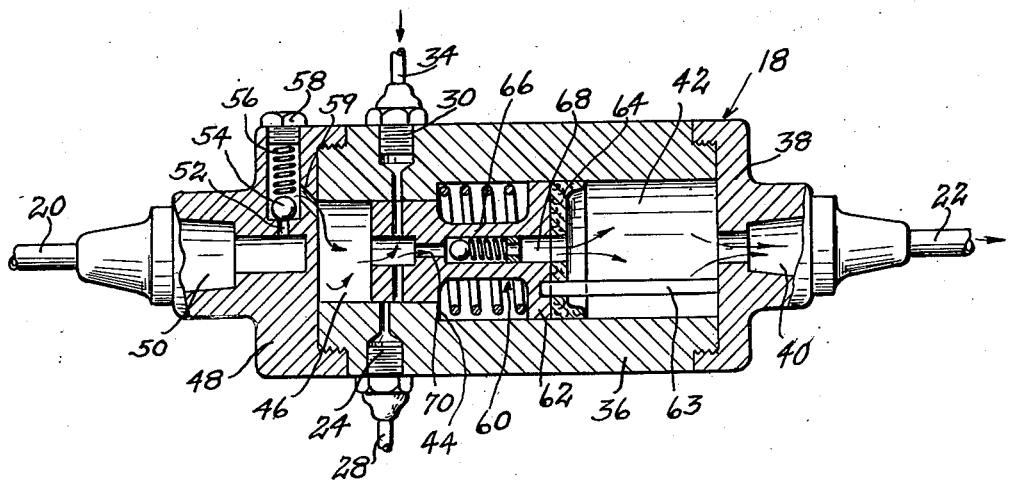
Figure 2 is a view in longitudinal section through the axis of the injector valve shown in the system in Figure 1, with the movable valve element thereof in the position it assumes when the pump is at rest.

The construction of valve 18, and its manner of operation in the system shown, will be clearly understood by a consideration of Figures 2, 3, and 4 showing such valve with the movable valve element thereof in the various positions the latter assumes during different parts of the operating cycle of the system. Valve 18 consists of a main body 36 of cylindrical shape, the right hand end of which, as shown in these figures, has a cylindrical chamber 42 therein, such chamber being closed by the cap 38 screwed onto the body 36, as shown. Cap 38 has a central passage 40 therein and thereon means by which pipe 22 is connected thereto. Chamber 42 communicates with a smaller cylindrical chamber 46 at the left hand end of member 36, shoulder 44 forming the boundary between the larger and smaller chambers. The smaller chamber is completed by means of the cap 48 at the left of the valve, such cap likewise being screwed upon the body 36. Cap 48 is provided with an axial chamber 50 which communicates with the pipe 20 connected to the cap, chamber 50 being imperforate at its inner end but for the radial valve port 52 leading therefrom. Such valve port communicates with the larger radial valve chamber 53 in which is positioned the valve ball 54 urged downwardly into closed position by means of the spring 56. A cap 58 screwed into the outer end of chamber 53 forms a fluid tight valve chamber, as well as an abutment for the valve spring. An inlet port 59 from chamber 53 slopes downwardly and inwardly, establishing a fluid connection between pipe 20 and chamber 46 when the valve ball 54 is raised.

The valve body 36 is provided with the two radial ports 24 and 30 which communicate with the chamber 46 therein, port 30 being connected with pump bleeding pipe 34 and port 24 being connected to pump priming pipe 28. Port 30 is, as shown, positioned somewhat to the right of port 24.

The movable valve element 60 has an enlarged head 62 at the right, such head being provided with the cup packing 64. A coil spring 78 positioned around the reduced neck portion 66 of the movable valve element and between the shoulder 44 and the rear surface of the head 62 constantly urges valve element 60 to the right. As shown in Figures 2, 3, and 4 the valve is provided with a stop rod 63, the inner end of which fits snugly in a hole provided through the packing 64 into a hole extending partially through head 62 of the valve. The length of such rod 63, when so mounted, determines the end position which the valve element assumes at the right when the outer end of such rod abuts the inner face of cap 38, as shown in Figure 2.

Valve element 60 is provided at the left with a smaller head 80 fitting within chamber 46 in fluid tight relationship. The valve element is provided with an axial passage 68 through the right hand head and reduced neck thereof, a smaller axial passage 70 and a larger axial passage 82 are provided within the outer left hand end of the smaller head 80, and a series of radial passages 84 from passage 82 are provided in head 80, such passages communicating with an annular slot (not shown) in the periphery of head 80 in the plane of the radial passages.

Within the passage 68 in the valve element are positioned the valve ball 72, the valve spring 74, and the annular spring abutment 76, which may be adjustably secured in such passage as by a screw threaded connection, not shown, between it and the surface of the passage. The valve ball functions as a check valve, preventing the flow of fluid from chamber 42 through such valve into chamber 46.

The operation of the system will be apparent from a consideration of one operating cycle of the oil burner. Assuming that pump 2 has stopped after previously subjecting pipes 6 and 22 to full pressure, chamber 42 will be full of fuel oil and chamber 46 will be full of solvent. The valve element 60 will be to the right, as shown in Figure 2, and valves 54 and 72 will be closed. Upon initiation of the pump, as by a demand from a thermostat, the pump 2 will start and fluid pressure in pipes 6 and 22 will rise. Before such pressure rises sufficiently to move valve element 60 to the left, however, any air that may be in the pump will be bled therefrom through bleeding port 32, pipe 34, and into chamber 46 through the port 30 and the valve port 84, communicating therewith. Thus the pump will automatically be bled at the beginning of each cycle. Rising pressure in pipe 22 will subject chamber 42 to increased pressure and thus thrust valve element 60 to the left against the action of spring 78.

Figure 3 shows the valve element after it has moved sufficiently to the left to cut off communication between port 30 and the top radial valve passage 84, and when it has reached such position that the bottom passage 84 communicates with port 24. When such position is reached, solvent from chamber 46 flows into pipe 28 and thus into the vacuum port of the pump. During such travel to the left of the movable valve element, both before the matching of valve port 24 and bottom port 84, and after port 24 has been shut off by head 80, as shown in Figure 4, excess solvent is permitted to flow through passages 82 and 68 into chamber 42 by reason of the opening of check valve 72. When valve element 60 moves further to the left, so that bottom port 84 no longer communicates with port 24, and until such valve element reaches its end position at the left, determined in this case by full compression of spring 74, as shown in Figure 4, both ports 24 and 30 are shut off and flow from chamber 46 takes place through valve 72 into chamber 42. After this, during continued operation of the pump, fluid flow in the system is confined to that from tank 10 through the pump 2 into the burner nozzle 4.

When the pump motor is shut off, as by the thermostat in the burner system, and the pump begins to slow down, the fluid pressure in pipe 6 and thus in chamber 42 decreases, so that valve element 60 begins to move toward the right. As the valve element moves in this direction, solvent is permitted to flow into chamber 46 through valve 54, so that, when the valve element reaches the position shown in Figure 3, solvent flows from such chamber outwardly through port 24 and into the vacuum port 26 of the pump. Continued movement of the valve element to the right, as the pump slows to a stop, brings the valve element to the position shown in Figure 2. During this time solvent mixed with some fuel oil, which has been present in chamber 42, is thrust outwardly through pipe 22 into nozzle 4. Thus, when the pump has completely stopped, both it and the burner nozzle are left containing fluid which contains a high percentage of solvent, thereby leaving such parts in ideal condition for operation when the next burner operating cycle begins.

Figure 6:
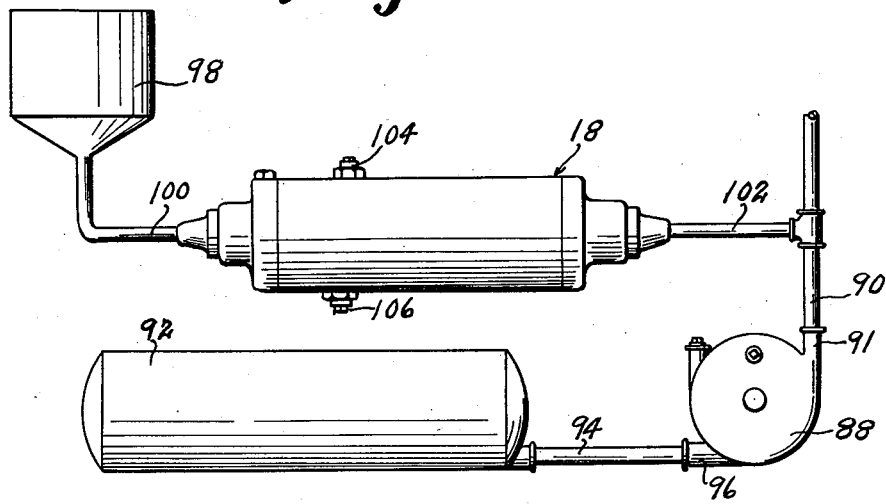
Figure 6 is a schematic layout of a system employing the valve arranged as in Figure 5.

In Figures 5 and 6, valve 18 is shown employed in a different system, which has, as its primary aim, the mixing of two different fluids, usually liquids, by injecting one into the other. Such system may be employed to advantage, for example, where it is desired to inject known quantities of one chemical into a body of another chemical held under pressure. In the system schematically shown in Figure 6 a pump 88 which may be, for instance, the pump employed in the oil burner with its vacuum and bleeding ports plugged, is fed with one chemical from a storage tank 92 which delivers such chemical to the pump through pipe 94 and inlet port 96 of the pump. The pump delivers such chemical under pressure through the delivery port 91 connected to the delivery pipe 90.

The tank 98, containing the second chemical to be injected into the first chemical, is connected to the left hand end of valve 18 by pipe 100, the right hand end of such valve being connected to pipe 90 by pipe 102. In this system the two side ports 30 and 24 of the valve are not used, and are closed by plugs 104 and 106, respectively. As shown in Figure 5, the structure of valve 18 is identical with that previously described. The abutment rod 107 in this instance, however, may be somewhat shorter than abutment rod 107, shown in Figure 5, may be chosen the movable valve element. The shorter abutment rod 17, shown in Figure 5, may be chosen of such length as to allow the valve to displace a predetermined quantity of fluid from chamber 42 upon its travel from the extreme left position to the extreme right position, shown in Figure 5.

In the system shown in Figure 6, mixing of the two chemicals is accomplished by periodically starting and stopping pump 88 so as to cause the valve element 60 to reciprocate, such valve element traveling to its extreme left position upon steady operation of the pump and to its extreme right position upon stoppage of the pump. Assuming chamber 46 of valve 18 to be full of fluid from tank 98, travel of the valve element to the left allows the flow of such fluid from chamber 46 through check valve 72 into chamber 42. When the pressure in chamber 42 drops, as a result of stoppage of the pump, movement of the movable valve element 60 to the right displaces the known amount of chemical in chamber 42 into the delivery pipe 90, thereby effecting its mixing with the chemical from tank 92. The fluid thus displaced from chamber 42 will usually be a mixture of a predominant amount of chemical from tank 98 with a smaller amount of chemical from tank 92.

Figure 7:
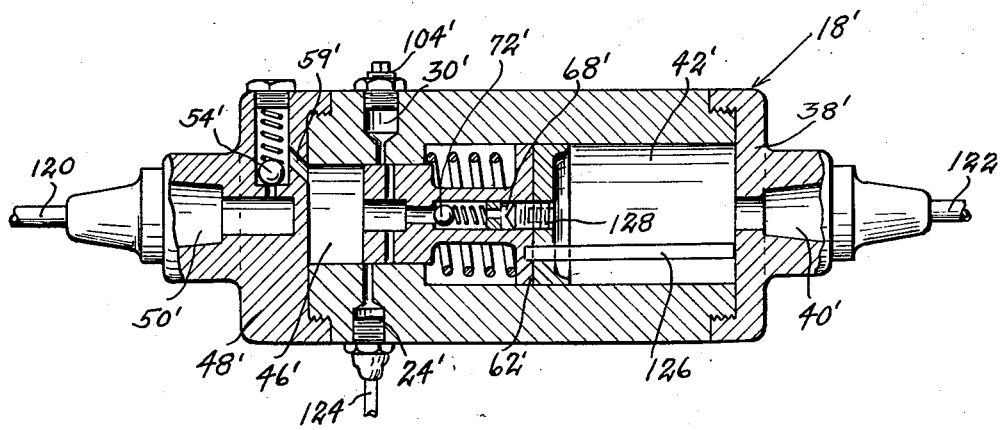
Figure 7 is a view in longitudinal section of the fluid injector valve modified to dispense with the function of the bleeding port and also the fluid mixing action in the large chamber thereof, the movable valve element being shown in the position it assumes when the pump is at rest.
Figure 8:
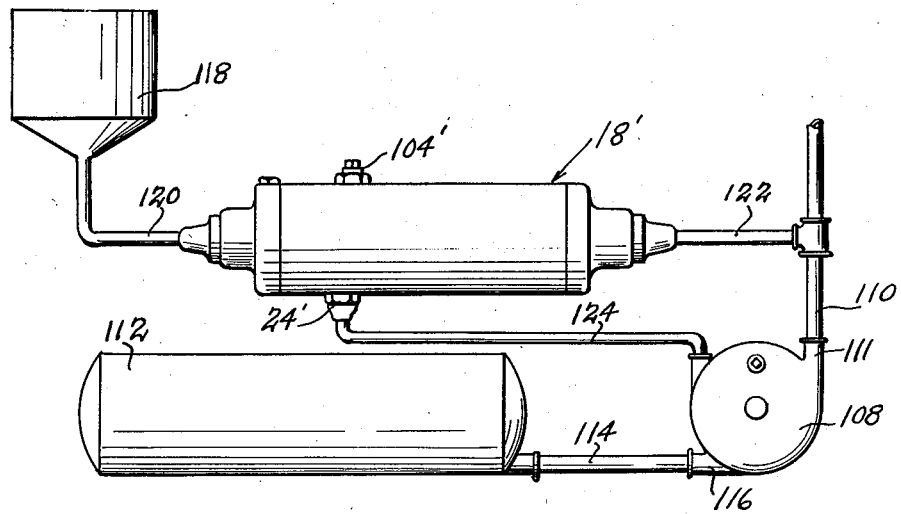
Figure 8 is a schematic layout of a system employing the valve arranged as shown in Figure 7.
Figure 9:
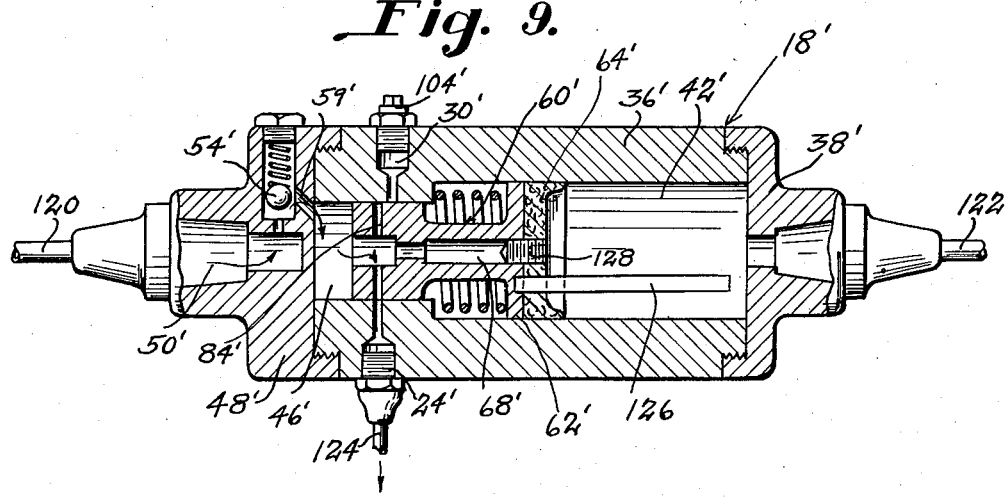
Figure 9 is a view in longitudinal cross-section of the valve, similar to that of Figure 7, showing the position of the movable valve element a short time after initiation of the action of the pump.

In the further modified system, shown in Figures 7, 8, and 9, the device may be an oil burner system or a fluid mixing system generally. In such system, schematically shown in Figure 8, the pump 108 is similar to pump 2 in the first embodiment except that the bleeder port is plugged. The pump is fed with the first main supply of a fluid from tank 112 through the pipe 114 connected to the supply port 116 of the pump, the pump feeding fluid under pressure from delivery port 111 into delivery pipe 110. A second fluid is fed from tank 118 through pipe 120 into the valve 18', the valve being connected to pipe 110 by pipe 122 connected to the right hand end thereof, and the side valve port 24 being connected to the vacuum port through pipe 124. Since the valve 18' is essentially similar in construction to valve 18, previously described, its parts are designated by the same reference numerals primed. In this instance, chamber 42' of the valve is not employed as a mixing chamber but is relied upon only as a means for moving the movable valve element 60'. Consequently valve 18' has its axial passage 68' through the movable valve element 60' plugged as by the plug 128 screwed thereinto. The valve ball 72' and the valve spring and abutment may be allowed to remain in passage 68', as shown in Figure 7, if desired, or they may be removed, as shown in Figure 9. Because the upper port 30' is not utilized in such installation, it is closed by the plug 104. Since it is not necessary that the radial valve passage 84' match with valve port 30' at the right hand end of the travel of valve element 60' an abutment rod 126 may be employed having a length somewhat the same as that of abutment rod 107 in the embodiment shown in Figures 5 and 6, bottom radial valve passage 84' thus riding past port 30' to the right.

In such system, fluid from tank 118 is introduced into the fluid from tank 112 only at the pump. Variations in pressure in pipe 110, as by starting and stopping pump 108, cause the valve element 60' to move to the left and to the right, respectively. In both directions of travel, when the radial valve passage 84' matches the port 24' a small amount of fluid from chamber 46' is allowed to pass into pipe 124, and thus into the pump 108 where is mixes with the fluid from tank 112.

The system shown in Figures 7, 8, and 9 may thus be employed either as a mixing device generally, by which small quantities of one fluid, such as a liquid chemical may be mixed with a second fluid such as another liquid chemical. The system can, of course, also be used to introduce a solvent into the working parts of a system, such as that of an oil burner.

I have fully described and illustrated preferred embodiments of the fluid injector mixing system and valve therefor of my invention. It is to be understood, however, that such system and also the valve are capable of considerable variation within the teaching of the invention.

I claim as new the following:

1. A fluid mixing system comprising an intermittently operable pump having a supply port, a pressure port, and a bleeding port, a source of supply of a first fluid connected to the supply port of the pump, a first delivery system connected to the pressure port of the pump, a source of supply of a second fluid, a fluid injector valve connected to the last named source of supply, and a second delivery system connecting such valve to the first delivery system, the valve comprising a hollow valve body, a valve element mounted for longitudinal movement therein, a first cylindrical chamber in one end of the valve body, the valve element having a first end thereof mounted in such first chamber and functioning as a piston, the second delivery system including a connection from such first chamber to the first delivery system, the movable valve element having a passage therethrough longitudinally thereof, a check valve in such passage preventing the passage of fluid from the first cylindrical chamber therethrough but allowing fluid to flow into such chamber therethrough, the valve body having a port therein, a pipe connecting said port to the bleeding port of the pump, the valve body having a second cylindrical chamber selectively connected with the port by movement of the valve element, resilient means constantly urging the movable valve element to a position in which the volume in the first chamber between the walls thereof and the first end of the valve element is a minimum, the valve being so constructed and arranged that when the pressure in the first cylindrical chamber is substantially zero the bleeding port communicates with the second cylindrical chamber, and that when the pressure in the first chamber increases the valve element travels against the action of the resilient means so as to shut off the bleeding port from the second chamber, the source of supply of the second fluid communicating with the second chamber of the valve.

2. A liquid fuel burning system comprising an intermittently operable pump having a supply port, a pressure port, and a vacuum priming port, a source of supply of a liquid fuel connected to the supply port of the pump, and a first delivery system connected to the pressure port of the pump, a source of supply of a liquid solvent, an injector valve connected to the last named source of supply, and a second delivery system connecting such valve to the first delivery system, the valve comprising a hollow valve body, a valve element movably mounted therein, a first cylindrical chamber in one end of the valve body, the valve element having a first end thereof mounted in such first chamber and functioning as a piston, the second delivery system including a fluid connection from such first chamber to the first delivery system, the movable valve element having a passage therethrough longitudinally thereof, a check valve in such passage preventing the passage of fluid from the first cylindrical chamber therethrough but allowing fluid to flow into such chamber therethrough, the valve body having a port therein, a pipe connecting said port to the vacuum priming port of the pump, the valve body having a second cylindrical chamber selectively connected with the port by movement of the valve element, resilient means constantly urging the movable valve element to a position in which the volume in the first chamber between the walls thereof and the first end of the valve element is a minimum, the valve being so constructed and arranged that when the pressure in the first cylindrical chamber is substantially zero the pump priming port is shut off and that when the pressure in the first chamber increases the valve element travels against the action of the resilient means so as momentarily to connect the pump priming port with the second chamber, the source of supply of the solvent communicating with the second chamber of the valve.

3. A liquid fuel burning system comprising an intermittently operable pump having a supply port, a pressure port, a vacuum priming port, and a bleeding port, a source of supply of a liquid fuel connected to the supply port of the pump, a first delivery system connected to the pressure port of the pump, a source of supply of a liquid solvent, an injector valve connected to the last named source of supply, and a second delivery system connecting such valve to the first delivery system, the valve comprising a hollow valve body, a valve element mounted to move longitudinally therein, a first cylindrical chamber in one end of the valve body, the valve element having a first end thereof mounted in such first chamber and functioning as a piston, the second delivery system including a fluid connection from such first chamber to the first delivery system, the movable valve element having a passage therethrough longitudinally thereof, a check valve in such passage preventing the passage of fluid from the first cylindrical chamber therethrough but allowing fluid to flow into such chamber therethrough, the valve body having ports therein, a pipe connecting one of said ports to the vacuum priming port of the pump, and a pipe connecting the other of said ports to the bleeding port of the pump, the valve body having a second cylindrical chamber selectively and sequentially connected with the ports by movement of the valve element, resilient means constantly urging the movable valve element to a position in which the volume in the first chamber between the walls thereof and the first end of the valve element is a minimum, the valve being so constructed and arranged that when the pressure in the first cylindrical chamber is substantially zero the bleeding port communicates with the second cylindrical chamber and that when the pressure in the first chamber increases, the valve element travels against the action of the resilient means so as momentarily to connect the pump priming port with the second chamber, the source of supply of the solvent communicating with the second chamber of the valve.

4. A liquid fuel burning system comprising an intermittently operable pump having a supply port, a pressure port, a vacuum priming port, and a bleeding port, a source of supply of a liquid fuel connected to the supply port of the pump, a first delivery system connected to the pressure port of the pump, a source of supply of a liquid solvent, an injector valve connected to the last named source of supply, and a second delivery system connecting such valve to the first delivery system, the valve comprising a hollow valve body, a valve element mounted to move longitudinally therein, a first cylindrical chamber in one end of the valve body, the valve element having a first end thereof mounted in such first chamber and functioning as a piston, the second delivery system including a fluid connection from such first chamber to the first delivery system, the movable valve element having a passage therethrough longitudinally thereof, a check valve in such passage preventing the passage of fluid from the first cylindrical chamber therethrough, but allowing fluid to flow into such chamber therethrough, the valve body having ports therein, a pipe connecting one of said ports to the vacuum priming port of the pump, and a pipe connecting the other of said ports to the bleeding port of the pump, the valve body having a second cylindrical chamber selectively and sequentially connected with the ports by movement of the valve element, resilient means constantly urging the movable valve element to a position in which the volume in the first chamber between the walls thereof and the first end of the valve element is a minimum, the valve being so constructed and arranged that when the pressure in the first cylindrical chamber is substantially zero the first end of the movable valve element forms with the first chamber a space of minimum capacity and the bleeding port communicates with the second cylindrical chamber, and that when the pressure in the first chamber increases the valve element travels against the action of the resilient means toward the position in which the first end thereof forms with the first chamber a space of maximum capacity, so as momentarily to connect the pump priming port with the second chamber, the source of supply of the solvent communicating with the second chamber of the valve.

5. A fluid valve comprising a hollow valve body having an elongated cavity therein, said cavity including a first elongated cylindrical chamber and a second elongated cylindrical chamber of smaller diameter than the first chamber, the second chamber being positioned coaxially of the first chamber and in substantially end-to-end relationship therewith, a valve element mounted for longitudinal movement in the cavity, the valve element having a first head thereof fitting in the first chamber in fluid tight relationship therewith and functioning as a piston, and a second head fitting in the second chamber in fluid tight relationship therewith, the valve body having a first port substantially at the outer end of the first chamber, and a second port substantially at the outer end of the second chamber, the movable valve element having a passage therethrough longitudinally thereof, a check valve in such passage preventing the escape of fluid from the first chamber into the second, the valve body having a third port, which communicates with the second chamber, the second head of the valve element being provided with a fourth port, which selectively connects the longitudinal passage through the valve element with the third port in the valve body.

6. A fluid valve comprising a hollow valve body having an elongated cavity therein, said cavity including a first elongated cylindrical chamber and a second elongated cylindrical chamber of smaller diameter than the first chamber, the second chamber being positioned coaxially of the first chamber and in substantially end-to-end relationship therewith, a valve element mounted for longitudinal movement in the cavity, the valve element having a first head thereof fitting in the first chamber in fluid tight relationship therewith and functioning as a piston, and a second head fitting in the second chamber in fluid tight relationship therewith, the valve body having a first port substantially at the outer end of the first chamber, and an inlet passage in the valve body communicating with the second chamber, the inlet passage having a first check valve therein to allow fluid to be introduced into the second chamber therethrough but to prevent its escape from the second chamber therethrough, the movable valve element having a passage therethrough longitudinally thereof, a second check valve in such last named passage preventing the escape of fluid from the first chamber into the second chamber, the valve body having a second port, which communicates with the second chamber, the second head of the valve element being provided with a third port, which selectively connects the longitudinal passage through the valve element with the second port in the valve body.

7. A fluid valve comprising a hollow valve body having an elongated cavity therein, said cavity including a first elongated cylindrical chamber and a second elongated cylindrical chamber of smaller diameter than the first chamber, the second chamber being positioned coaxially of the first chamber and in substantially end-to-end relationship therewith, a valve element mounted for longitudinal movement in the cavity, the valve element having a first head thereof fitting in the first chamber in fluid tight relationship therewith and functioning as a piston, and a second head fitting in the second chamber in fluid tight relationship therewith, the valve body having a first port substantially at the outer end of the first chamber, an inlet passage in the valve body communicating with the second chamber, the inlet passage having a first check valve therein to allow fluid to be introduced into the second chamber therethrough but to prevent its escape from the second chamber therethrough, the movable valve element having a passage therethrough longitudinally thereof, a second check valve in such last named passage preventing the escape of fluid from the first chamber into the second chamber, the valve body having a second port communicating with the second chamber, the second head of the valve element being provided with a third port, which selectively connects the longitudinal passage through the valve element with the second port in the valve body, and means to urge the valve element to move toward the first chamber.

8. A fluid valve comprising a hollow valve body having an elongated cavity therein, said cavity including a first elongated cylindrical chamber and a second elongated cylindrical chamber of smaller diameter than the first chamber, the second chamber being positioned coaxially of the first chamber and in substantially end-to-end relationship therewith, a valve element mounted for longitudinal movement in the cavity, the valve element having a first head thereof fitting in the first chamber in fluid tight relationship therewith and functioning as a piston, and a second head fitting in the second chamber in fluid tight relationship therewith, the valve body having a first port substantially at the outer end of the first chamber, an inlet passage in the valve body communicating with the second chamber, the inlet passage having a first check valve therein to allow fluid to be introduced into the second chamber therethrough but to prevent its escape from the second chamber therethrough, the movable valve element having a passage therethrough longitudinally thereof, a second check valve in such last named passage preventing the escape of fluid from the first chamber into the second chamber, the valve body having two longitudinally displaced, third, ports communicating with the second chamber, the second head of the valve element being provided with a plurality of radially disposed, fourth, ports located in the same plane transversely thereof selectively connecting the longitudinal passage through the valve element with the two longitudinally disposed, third, ports in the valve body.

9. A fluid valve comprising a hollow valve body having an elongated cavity therein, said cavity including a first elongated cylindrical chamber and a second elongated cylindrical chamber of smaller diameter than the first chamber, the second chamber being positioned coaxially of the first chamber and in substantially end-to-end relationship therewith, a valve element mounted for longitudinal movement in the cavity, the valve element having a first head thereof fitting in the first chamber in fluid tight relationship therewith and functioning as a piston, and a second head fitting in the second chamber in fluid tight relationship therewith, the valve body having a first port substantially at the outer end of the first chamber, an inlet passage in the valve body communicating with the second chamber, the inlet passage having a first check valve therein to allow fluid to be introduced into the second chamber therethrough but to prevent its escape from the second chamber therethrough, the movable valve element having a passage therethrough longitudinally thereof, a first check valve in such last named passage preventing the escape of fluid from the first chamber into the second chamber, the valve body having two longitudinally displaced, third, ports communicating with the second chamber, the second head of the valve element being provided with a plurality of radially disposed, fourth, ports located in the same plane transversely thereof selectively connecting the longitudinal passage through the valve element with the two longitudinally displaced, third, ports in the valve body, and means constantly to urge the valve element to move toward the first chamber.

GEORGE F. SMEDES.

REFERENCES CITED

The following references are of record in the file of this patent:

UNITED STATES PATENTS

| Number | Name | Date |
| --- | --- | --- |
| 1,643,616 | Zinn et al. | Sept. 27, 1927 |
| 1,753,662 | Merker | Apr. 8, 1930 |
| 1,765,457 | Shutt | June 24, 1930 |
| 2,086,173 | Parker | July 6, 1937 |
| 2,126,880 | Gardner | Aug. 16, 1938 |
| 2,142,329 | Nika | Jan. 3, 1939 |
| 2,220,209 | Carpenter | Nov. 5, 1940 |
| 2,291,746 | Nelson et al. | Aug. 4, 1942 |
| 2,362,586 | Ruth | Nov. 14, 1944 |
| 2,416,345 | Piccardo | Feb. 25, 1947 |